June 22, 1948.  E. A. STALKER  2,443,808
ADJUSTABLE FLAP FOR ROTATING WINGS
Filed Oct. 13, 1943
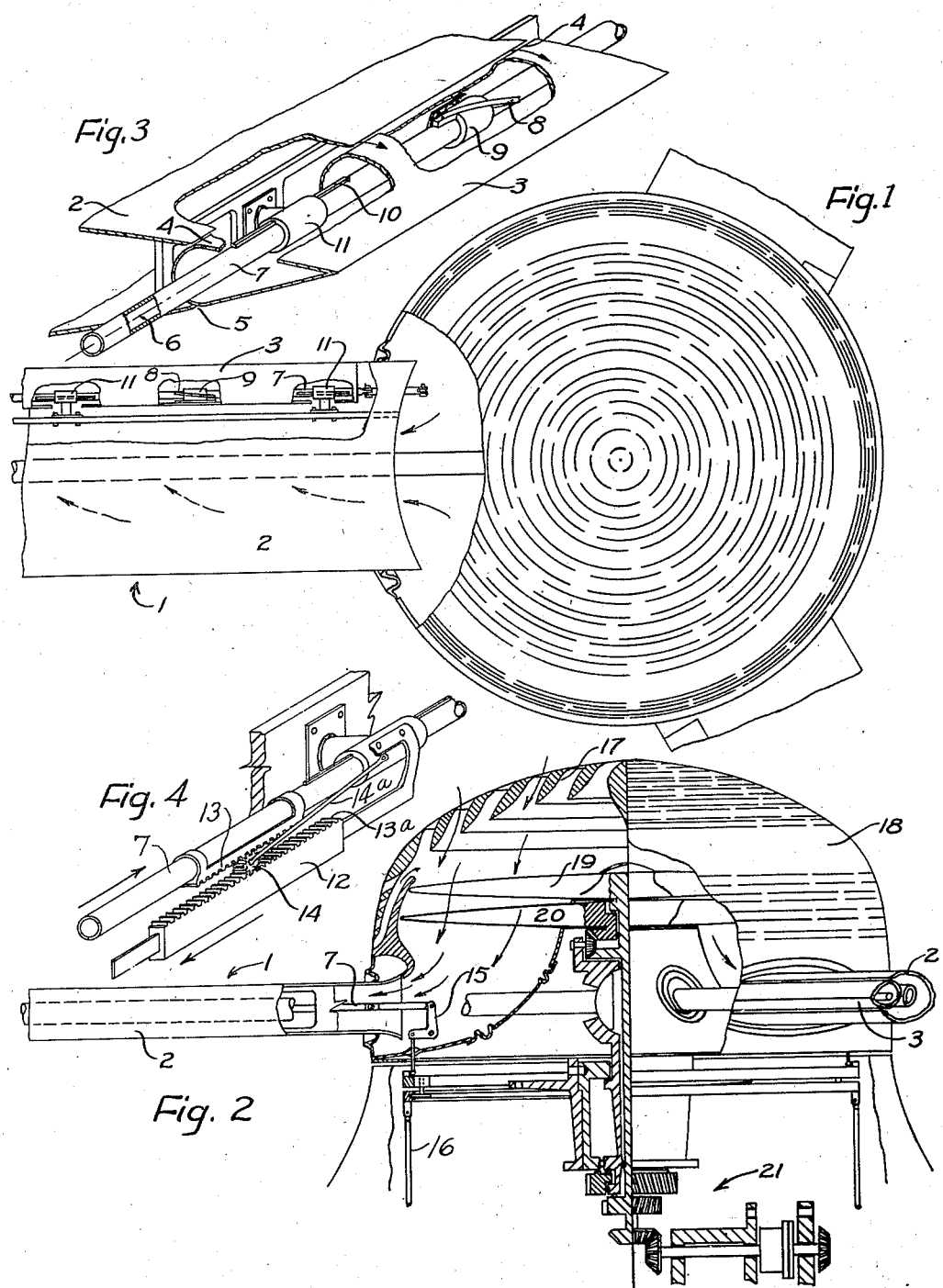
INVENTOR
Edward A. Stalker
By Marechal and Biebel
ATTORNEYS Patented June 22, 1948

2,443,808

UNITED STATES PATENT OFFICE 2,443,808

ADJUSTABLE FLAP FOR ROTATING WINGS

Edward A. Stalker, Bay City, Mich.

Application October 13, 1943, Serial No. 506,018

2 Claims. (Cl. 244—42)

My invention relates to aircraft and more particularly to wings having adjustable flaps.

It is the principal object to provide a wing having an adjustable flap supported from the wing main body incorporating a simple and reliable flap adjusting mechanism substantially enclosed within the flap.

It is also an object to provide a wing main body and a flap adjustably supported therefrom in such relation as to form a spanwise slot of uniform width between the adjacent parts of the flap and main body, the flap adjusting mechanism being located within the flap leaving an air flow passage through the interior of the wing main body free of such mechanism and substantially unobstructed.

It is a further object to provide such a wing suitable for use as the blade of a helicopter in which properly balanced weight conditions are maintained throughout the adjusting movements of said flap.

I accomplish the above objects by the means illustrated in the accompanying drawings in which—

Fig. 1 is a fragmentary view in plan with certain portions broken away of the rotor of a helicopter constructed in accordance with this invention;

Fig. 2 is a broken side elevation partially in section of the helicopter rotor;

Fig. 3 is a broken perspective view of a rotor wing; and

Fig. 4 is a fragmentary perspective of part of the mechanism to rotate the flap.

In accordance with the present invention a wing construction is provided in which the flap is adjustably supported from the wing main body and the actuating mechanism for adjusting the flap is substantially entirely housed within the flap itself. A strong compact mechanism is provided for adjusting the flap position, such mechanism assuring the accurate and uniform movement of the flap throughout its entire spanwise extent.

These features are of particular value in the case of wings provided with slots for the flow of air therethrough such as for the purpose of boundary layer control. With the flap adjusting mechanism located within the nose portion of the flap, the wing main body is left substantially free of such parts, thus affording free and unobstructed passages for the flow of air through the slots. In case the slot is formed by a passage located between the flap and the wing main body, the provision for maintaining uniform adjustment of the flap also assures that the slot width and hence the effects produced thereby will also be uniform throughout the spanwise extent thereof.

The invention is applicable to both fixed wings and rotating wings and in the latter case additional provision is made for compensating the change in mass distribution within the blade which occurs as the flap position is adjusted. Preferably such compensation is effected by means of a weight of predetermined mass and location, the position of which is shifted as required to balance the changes in mass distribution produced as the flap adjusting mechanism is operated. For purposes of illustration the invention will be hereinafter described with particular reference to its application to the blades of a helicopter.

In the drawing which discloses a preferred embodiment of the invention the wings of the helicopter are shown at 1, each wing being composed of the wing forebody or main body 2 and the flap 3. The flap is rotatably supported from the main body so as to vary the slot widths while raising or lowering the flap. Preferably the nose portion of the flap is shaped so that as it is rotated, a differential control of the slot widths is secured, increasing the upper slot and decreasing the lower slot for example when the flap is depressed. There are slots 4 and 5 at the juncture of the upper and lower walls of the adjacent parts of the main body and flap respectively.

The mechanism to rotate the flap is contained primarily within the flap. It consists of the push rod 7 rotatable about the spanwise axis 6 and having a series of helical splines 8 spaced along its length at frequent intervals. These splines or threads are movable within helical grooves cut in the corresponding series of sleeves 9 fixed to the flap at spaced points. The tube 7 also has the splines 10 which slide in grooves within the spaced brackets 11 which project rearwardly from the forebody, preferably alternating with splines 8 and sleeves 9, to thereby keep the tube from rotating about its axis when it is pushed spanwise. Its spanwise motion forces the flap to rotate through the agency of the spiral splines 8 and the sleeves 9. Since a number of such spline elements 8 and 10 are spaced along the span the torque on the flap is distributed along the span and the flap is rotated evenly to cause a positive and substantially uniform variation in the slot width at various locations along the span.

A movement of the push rod spanwise would if uncompensated introduce an undesirable outward shift of the center of gravity of the rotor from the axis of rotation. This is compensated by the weight 12, which is moved in opposition to the push tube by means of the rack 13 carried by the tube 7 and pinion 14 held by bracket 14a and meshing with the rack teeth 13 and with corresponding teeth 13a on weight 12. Thus any movement of tube 7 in one direction spanwise of the blade is accompanied by an equal and opposite movement of weight 12. It will also be noted that the tube and weight are in the same vertical plane and are located relatively close to each other. By suitable selection of the mass and position of weight 12, its changing centrifugal force effect is made to substantially balance and compensate for that produced by the travel of tube 7.

The push tube 7 is moved by the bell crank 15 and suitable mechanism connecting it to the rod 16 which runs to the pilot's steering control.

Air for discharge through the blade slots is inducted through slots 17 in the helicopter hub 18 by the rotors 19 and 20. These are driven by the power plant (not shown) through a suitable gear train 21. Such air flows outwardly through the hollow interior of the blades as indicated by the arrows in Figs. 1 and 2, and is then discharged outwardly through the upper slots 4 and lower slots 5.

Although I have illustrated the application of the device to a helicopter it is equally adaptable to the wings of airplanes. It is particularly useful in boundary layer control wings having an internal flow and also in wings where space in the main body is to be conserved, the location of the flap adjusting mechanism in the interior of the flap leaving the wing main body substantially free of internal structure for this purpose and hence not obstructing the flow of air therethrough.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In combination, a wing main body, a flap, means to support adjustably said flap on said body at the rear thereof to form a wing, said means including a shaft having a spline thereon, a part having a groove to mate with said spline and slidably support said shaft for predetermined spanwise motion within said wing, said shaft also having a spiral spline, and a sleeve receiving said spiral spline and connected to said flap to effect rotation thereof in response to said spanwise motion of said shaft, said grooved part serving to take the rotational reaction to prevent the said shaft from rotating.

2. In combination, a wing main body, a flap, means for supporting said wing main body and said flap for rotation about an upright axis, means for adjustably supporting said flap from said wing main body, means movable spanwise of said flap for effecting adjustment of the position of said flap, and adjustable means controlled in response to movement of said movable adjusting means for compensating for the change of centrifugal force effect produced by the movement of said movable adjusting means.

EDWARD A. STALKER.

REFERENCES CITED

The following references are of record in the file of this patent:

UNITED STATES PATENTS

| Number | Name | Date |
| --- | --- | --- |
| 1,449,129 | Pescara | Mar. 20, 1923 |
| 2,076,090 | Myers | Apr. 6, 1937 |
| 2,243,885 | Schweisch | June 3, 1941 |
| 2,254,304 | Miller | Sept. 2, 1941 |

FOREIGN PATENTS

| Number | Country | Date |
| --- | --- | --- |
| 504,747 | Great Britain | May 1, 1939 |